(12) United States Patent
Kita

(10) Patent No.: US 7,309,067 B2
(45) Date of Patent: Dec. 18, 2007

(54) CONTINUOUSLY VARIABLE TRANSMISSION

(75) Inventor: Akihiko Kita, Anjo (JP)

(73) Assignee: Aisin AW Co., Ltd. (JP)

( * ) Notice: Subject to any disclaimer, the term of this patent is extended or adjusted under 35 U.S.C. 154(b) by 270 days.

(21) Appl. No.: 11/108,663

(22) Filed: Apr. 19, 2005

(65) Prior Publication Data
US 2006/0030447 A1   Feb. 9, 2006

(30) Foreign Application Priority Data
Aug. 3, 2004   (JP) ............................. 2004-227283

(51) Int. Cl.
*F16H 37/02*   (2006.01)
(52) U.S. Cl. ..................................... 275/210
(58) Field of Classification Search ................ 475/210, 475/207, 219
See application file for complete search history.

(56) References Cited

U.S. PATENT DOCUMENTS 4,550,629 A * 11/1985 Kawamoto ................. 475/210
4,602,525 A * 7/1986 Moroto et al. .............. 475/210
4,864,889 A * 9/1989 Sakakibara et al. ......... 475/211
5,292,290 A * 3/1994 Scholz et al. ............... 475/231
6,106,428 A * 8/2000 Koneda et al. ............. 475/210
6,524,210 B1 * 2/2003 Vorndran .................... 475/210
2004/0082421 A1 * 4/2004 Wafzig ....................... 475/207

* cited by examiner

*Primary Examiner*—Roger Pang
*Assistant Examiner*—Justin K. Holmes
(74) *Attorney, Agent, or Firm*—Bacon & Thomas, PLLC

(57) ABSTRACT

An input shaft, a stepless speed change unit, a forward-reverse switching mechanism, and an output shaft are arranged in that order in a power transmitting path of a continuously variable transmission. The forward-reverse switching mechanism includes i) a gear mechanism having a sun gear which rotates in the same direction as the rotation output from the stepless speed change unit, a carrier which is always fixed (stationary), and a ring gear which rotates in the reverse direction, ii) a clutch between the sun gear and the output shaft, and iii) a clutch between the ring gear and the output shaft. This structure enables the transmission of power between the gear mechanism and the stepless speed change unit and the vehicle drive wheels to be interrupted by the clutches when the vehicle is being towed or is stopped suddenly, and also obviates the need for a brake able to withstand a large amount of torque.

17 Claims, 8 Drawing Sheets

(a)

(b)

|  | C1 | C2 |
|---|---|---|
| D (FORWARD) | ○ | × |
| R (REVERSE) | × | ○ |
| N | × | × |
| BEING TOWED | × | × |

(a)

(b)

|  | C1 | C2 |
|---|---|---|
| D (FORWARD) | ○ | × |
| R (REVERSE) | × | ○ |
| N | × | × |
| BEING TOWED | × | × |

(a)

(b)

|  | C1 | C2 |
|---|---|---|
| D (FORWARD) | O | × |
| R (REVERSE) | × | O |
| N | × | × |
| BEING TOWED | × | × |

(a)

(b)

|  | C1 | C2 |
|---|---|---|
| D (FORWARD) | ○ | × |
| R (REVERSE) | × | ○ |
| N | × | × |
| BEING TOWED | × | × |

CONTINUOUSLY VARIABLE TRANSMISSION

CROSS REFERENCE TO RELATED APPLICATIONS

This application claims, under 35 USC 119, priority of Japanese Application No. 2004-227283 filed Aug. 3, 2004, the teachings of which are incorporated herein in their entirety, inclusive of the specification, claims and drawings.

BACKGROUND OF THE INVENTION

1. Field of the Invention

The present invention relates to a continuously variable automatic transmission mounted in, for example, a vehicle. More particularly, the present invention relates to a continuously variable automatic transmission provided with a forward-reverse switching mechanism disposed between a stepless speed change unit and an output shaft in a power transmitting path. The forward-reverse switching mechanism includes a fixed (always stationary) element of a gear mechanism, a clutch which is engaged in forward, and a clutch which is engaged in reverse.

2. Description of the Related Art

A belt type (CVT type) continuously variable automatic transmission (hereinafter referred to as a "continuously variable transmission") mounted in, for example, a vehicle, typically includes a forward-reverse switching mechanism for switching the input rotation between forward rotation and reverse rotation, and a speed change unit for freely changing the speed ratio. The forward-reverse switching mechanism and the stepless speed change unit can be arranged between an input shaft which is rotatably driven by an engine, and an output shaft (wheel axles) which is connected to the vehicle drive wheels, with the forward-reverse switching mechanism being positioned either in front of the stepless speed change unit or in the rear of the stepless speed change unit.

The preferred order of arrangement is: input shaft, forward-reverse switching mechanism, stepless speed change unit, and output shaft (see JP(A) 61-270542), which arrangement enables the forward-reverse switching mechanism to be made relatively compact. Further, this preferred arrangement prevents a large amount of torque from being applied to the forward-reverse switching mechanism because the rotation received by the forward-reverse switching has been slowed by the stepless speed change unit. However, in this arrangement, because the stepless speed change unit is connected to the vehicle drive wheels, if the vehicle stops suddenly, for example, the pulley of the stepless speed change unit stops, together with the vehicle drive wheels, while on the high speed side, which may result in the vehicle being unable to take off again. Also, if the vehicle is towed while the engine is running, no lubrication oil is circulated and the durability of the stepless speed change unit may be adversely affected due to the fact that it is rotated by the vehicle drive wheels.

Therefore, it has been proposed to cut off the transmission of power between the stepless speed change unit and the output shaft. For example, JP(A) 2001-124191 discloses a drivetrain having a clutch between the stepless speed change unit and the output shaft. JP(A) 11-159596 discloses a drivetrain with the input shaft, the stepless speed change unit, the forward-reverse switching apparatus, and the output shaft arranged in this order. As a result, even if the vehicle (i.e., the vehicle drive wheels) is stopped, the pulley of the stepless speed change unit can be returned to the low speed side while being rotatably driven, and rotation of stepless speed change unit can be prevented when the vehicle is being towed.

Typically, the forward-reverse switching mechanism outputs reverse rotation by engaging a brake to stop rotation of one element of a planetary gear set and rotating a gear in reverse relative to the input rotation. Because input torque and torque that becomes a reaction force act on that brake, it receives application of a larger amount of torque than that applied to a clutch which selectively transmits power.

In a continuously variable transmission in which the input shaft, the stepless speed change unit, the forward-reverse switching mechanism, and the output shaft are arranged in this order in the power transmitting path, rotation is input to the forward-reverse switching mechanism only after it has been slowed by the stepless speed change unit. As a result, a relatively large amount of torque is input to the forward-reverse switching mechanism, particularly when the vehicle starts moving, so the brake must withstand an even larger amount of torque and must be made correspondingly larger, so that the objective of compactness of the continuously variable transmission cannot be achieved.

Further, provision of a clutch between the stepless speed change unit and the output shaft, as described above, means the addition of another clutch, which creates additional problems. For example, the additional clutch hinders the objectives of compactness and cost reduction due to the increase in the number of components, and also increases the complexity of control.

SUMMARY OF THE INVENTION

Accordingly, the present invention solves the foregoing problems by providing a continuously variable transmission in which a forward-reverse switching mechanism is arranged between a stepless speed change unit and an output shaft to provide a power transmitting path, and includes a fixed (always stationary) element, a clutch that is applied in forward travel, and a clutch that is applied in reverse.

According to a first aspect of the present invention, an input shaft, a stepless speed change unit, a forward-reverse switching mechanism, and an output shaft are arranged in this order for transmission of power from a drive source. The forward-reverse switching mechanism includes i) a gear mechanism having a first rotary element that rotates in the same direction as the rotation output from the stepless speed change unit, a fixed element that is always stationary, and a second rotary element that rotates in the direction opposite the rotation output from the stepless speed change unit, ii) a first clutch disposed between the first rotary element and the output shaft, and iii) a second clutch disposed between the second rotary element and the output shaft. As a result, it is possible to disconnect the power transmission path between the stepless speed change unit and the output shaft using the first clutch and the second clutch when the vehicle is stopped suddenly or is being towed, for example. Also, even if the vehicle is stopped, it is still possible to return a pulley of the stepless speed change unit to the low speed side while it is rotatably driven, and to prevent the stepless speed change unit from being rotated while the vehicle is being towed. As a result, it is no longer necessary to provide a separate (dedicated) clutch solely for the purpose of interrupting power transmission, which is advantageous for several reasons. For example, it enables the continuously variable transmission to be made more compact. It also enables costs to be reduced due to fewer components being used, and avoids an increase in complexity of control of the transmission. In addition, the fixed element of the gear mechanism is always stationary which obviates need for a large brake, thus enabling the continuously variable transmission to be made yet more compact.

According to a second aspect of the present invention, the input shaft and a primary pulley of the stepless speed change unit are arranged on a first axis, a secondary pulley of the stepless speed change unit and the forward-reverse switching mechanism are arranged on a second axis that is in parallel with the first axis, and the output shaft is arranged on a third axis that is in parallel with the first and second axes. The second clutch is applied when running in forward, and the first clutch is applied when running in reverse. As a result, forward rotation or reverse rotation can be output to the output shaft without provision of a countershaft, thereby enabling the continuously variable transmission to be made more compact.

According to a third aspect of the present invention, the gear mechanism is a single pinion planetary gear set wherein the first rotary element is a sun gear into which rotation is input from the stepless speed change unit, the fixed element is a carrier, and the second (reverse) rotary element is a ring gear. As a result, slowed reverse rotation can be output by the ring gear in forward running, making it unnecessary to provide a countershaft for reversing and slowing the rotation, which enables the continuously variable transmission to be made more compact.

According to a fourth aspect of the present invention, the gear mechanism is a ravigneaux type planetary gear set. Rotation from the stepless speed change unit is input to a first sun gear. The first rotary element is a carrier, the fixed element is a ring gear, and the second rotary element is a second sun gear. As a result, reduced speed reverse rotation can be output by the second sun gear when running forward, and reduced speed forward rotation can be output by the carrier when running in reverse, making it unnecessary to provide a countershaft to slow the rotation, thus enabling the continuously variable transmission to be made more compact.

However, in one embodiment (a fifth aspect) of the present invention, the continuously variable transmission further includes a countershaft disposed between the forward-reverse switching mechanism and the output shaft. Furthermore, the input shaft and the primary pulley of the stepless speed change unit are arranged on a first axis, the secondary pulley of the stepless speed change unit and the forward-reverse switching mechanism are arranged on a second axis that is in parallel with the first axis, the countershaft is arranged on a third axis that is in parallel with the first axis and the second axis, and the output shaft is arranged on a fourth axis that is in parallel with the first axis, the second axis, and the third axis. Also, the first clutch is applied when in forward, and the second clutch is applied in reverse. As a result, the transmission of the present invention can output forward or reverse rotation to the output shaft, with a sufficiently large amount of torque output during take-off in reverse as well as in forward, due to a reduction gear provided on the countershaft. Also, when forward rotation is output, power can be transmitted without passing through the gear mechanism of the forward-reverse switching mechanism. As a result, gear noise can be reduced, thereby making forward running quieter.

According to a sixth aspect of the present invention, the gear mechanism is a single pinion planetary gear set. In this embodiment, the first rotary element is a ring gear into which rotation is input from the stepless speed change unit, the fixed element is a carrier, and the second rotary element is a sun gear. As a result, reverse rotation can be output by the sun gear to the output shaft in reverse. Further, a higher speed reverse rotation can be output by the sun gear so that suitable torque can be transmitted to the output shaft when running in reverse where sudden acceleration is not necessary.

According to a seventh aspect of the present invention, the gear mechanism is a double pinion planetary gear set. In this embodiment, the first rotary element is a carrier into which rotation is input from the stepless speed change unit, the fixed element is a ring gear, and the second rotary element is a sun gear. As a result, reverse rotation can be output by the sun gear to the output shaft.

In an eighth aspect, the present invention provides a double pinion planetary gear set, i.e., a first pinion gear and a second pinion gear, the first pinion gear being in mesh with the sun gear and the second pinion gear, and the second pinion gear being in mesh with the ring gear and the first pinion gear.

DETAILED DESCRIPTION OF THE PREFERRED EMBODIMENTS

First Embodiment

Figure 1:
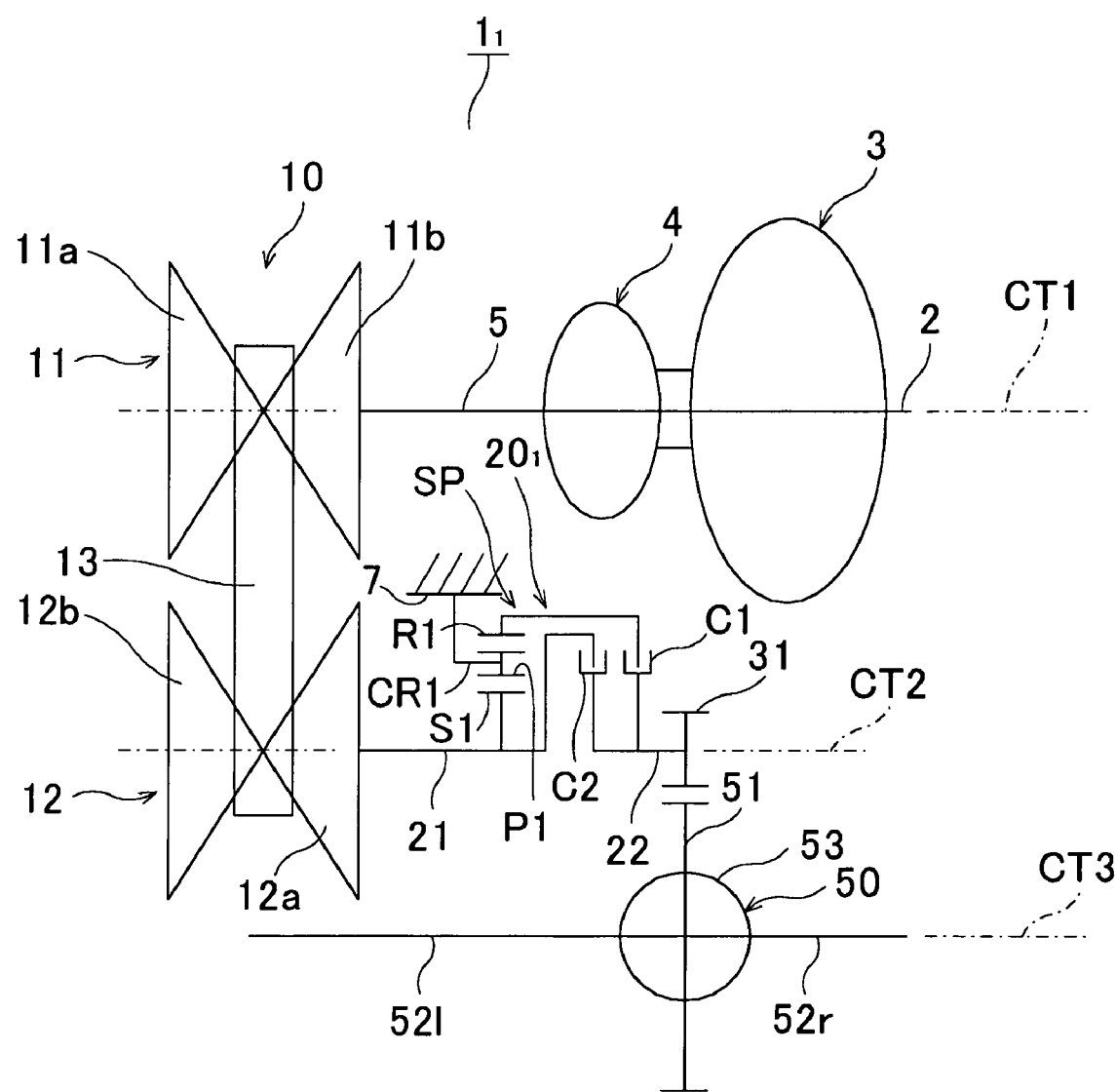
FIG. 1 is a skeletal view of a continuously variable transmission according to a first embodiment of the present invention.

A first embodiment of a continuously variable transmission (CVT) $1_1$ according to the present invention is shown in FIG. 1 as including a torque converter 3, an oil pump 4, a belt type stepless speed change unit 10, a forward-reverse switching mechanism $20_1$, and a differential gear unit 50, all housed in a case 7 in which a housing case and a transmission case have been integrated. Further, the belt type stepless speed change unit 10 includes a primary pulley 11, a secondary pulley 12, and a belt 13, e.g., a rubber belt, a metal push-type belt (a so-called VanDorne type), a metal pulltype belt, or other endless belt made of metal rings or the like. The belt 13 is wound around the primary pulley 11 and the secondary pulley 12.

The input shaft 2 which is connected to a crankshaft of an engine (drive source—not shown), the torque converter 3 (and the oil pump 4), a first connecting shaft 5, and the primary pulley 11 are all aligned and arranged on a first axis CT1. Similarly, the secondary pulley 12, the forward-reverse switching mechanism $20_1$, and an output gear 31 are all aligned and arranged on a second axis CT2. Left and right wheel axles 52r and 52l of the differential gear unit 50 are arranged on a third axis CT3. These three axes, i.e., the first axis CT1, the second axis CT2, and the third axis CT3, are all in parallel with one another and, when viewed from the side, are arranged in a triangular formation.

The torque converter 3 includes a pump impeller which is connected to the input shaft 2, a turbine runner which is connected to the first connecting shaft 5, a stator, and a lock-up clutch which provides a direct mechanical connection between the pump impeller and the turbine runner. Accordingly, rotation of the input shaft 2 is transmitted to the first connecting shaft 5 either hydraulically via the pump impeller, the turbine runner, and the starter or by a mechanical connection through the lock-up clutch.

The oil pump 4 is, for example, a vane pump or the like with its rotor connected to the input shaft 2 via a pump impeller. Accordingly, the oil pump 4 is operatively linked to, and thus driven by, the engine.

The primary pulley 11 of the stepless speed change unit 10 has a movable sheave 11a and a fixed sheave 11b that is connected to the first connecting shaft 5. The movable sheave 11a is slidably supported by a shaft portion, not shown, of the fixed sheave 11b. A hydraulic actuator, for effecting shifting is provided on the back face of the movable sheave 11a. Also, the shaft portion of the fixed sheave 11b is rotatably supported by the case 7 via ball bearings, for example. Accordingly, the movable sheave 11a and the fixed sheave 11b are rotatably driven by rotation transmitted from the input shaft 2 (i.e., the engine) via the torque converter 3 and the first connecting shaft 5.

Likewise, the secondary pulley 12 has a fixed sheave 12b and a movable sheave 12a which is slidably supported by a shaft portion, not shown, of the fixed sheave 12b. A hydraulic actuator is provided on the back face of the movable sheave 12a. Similarly, both ends of the shaft portion of the fixed sheave 12b are rotatably supported by the case 7 via roller bearings or the like. Therefore, the movable sheave 12a and the fixed sheave 12b are rotatably driven by the belt 13 at a speed which changes depending on the widths of both pulleys 11 and 12.

The forward-reverse switching mechanism $20_1$ includes a second connecting shaft 21 which is connected to the shaft portion of the fixed sheave 12b of the secondary pulley 12, a planetary gear set (i.e., gear mechanism) SP, a forward clutch (second clutch) C1, a reverse clutch (first clutch) C2, and a third connecting shaft 22 that is connected to the output gear 31. The planetary gear set SP is a so-called single pinion planetary gear set which includes a sun gear (first rotary element) S1, a ring gear (second rotary element) R1, and a carrier (fixed element) CR1 which has a single pinion gear P1 in mesh with both the sun gear S1 and the ring gear R1.

The sun gear S1 of the planetary gear set SP is connected to the second connecting shaft 21 and the carrier CR1 is always fixed to the case 7. The reverse clutch C2 is disposed between the sun gear S1 and the second connecting shaft 21, and the third connecting shaft 22 that is connected to the output gear 31. The forward clutch C1 is disposed between the ring gear R1 and the third connecting shaft 22.

The differential gear unit 50 includes a differential case 53 and differential gearing housed therein. The differential case 53 is rotatably supported by the case 7 and has a ring gear 51 of relatively large diameter connected to the differential gearing via the differential case 53. Left and right wheel axles 52r and 52l, which are supported by the differential case 53, are connected via the differential gearing. The output gear 31 on the second axis CT2 is in mesh with the ring gear 51 on the third axis CT3. The output gear 31 has a relatively small diameter and the ring gear 51 has a relatively large diameter, whereby together they provide a relatively large reduction ratio.

Figure 2:
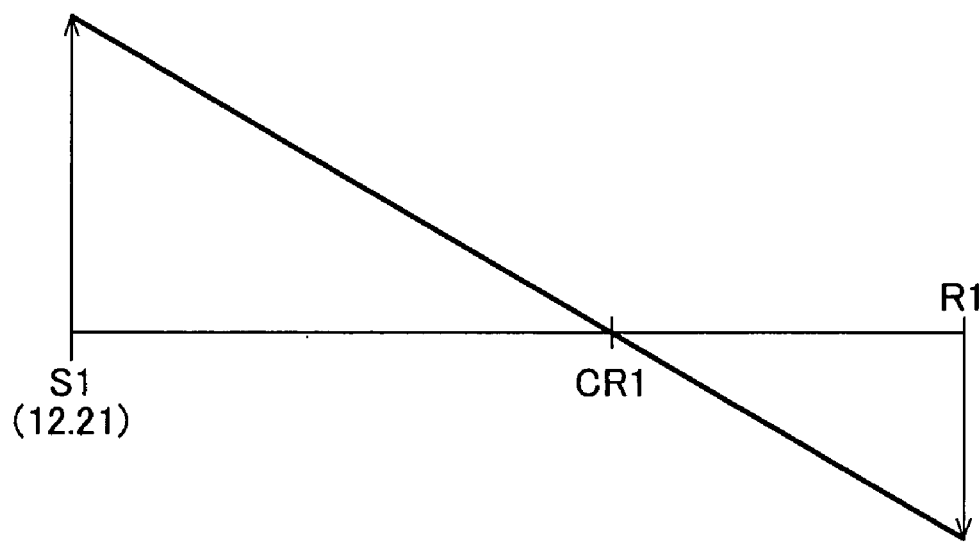
FIG. 2(a) is a velocity diagram for the forward-reverse switching mechanism of the first embodiment.
FIG. 2(b) is an application chart for clutches C1 and C2 in the first embodiment.

Next, operation of the continuously variable transmission $1_1$ will be described with reference to FIG. 2(b). As shown in FIG. 2(b), when a driver moves the shift lever to the position for the N (neutral) range, for example, the forward clutch C1 and the reverse clutch C2 are hydraulically released (as indicated by "X" in the drawing) by a hydraulic controller, not shown.

When the engine is running, rotation from the engine is input to the input shaft 2 and the primary pulley 11 is rotatably driven via the torque converter 3 and the first connecting shaft 5. Also, the pulley width of the primary pulley 11 is controlled to the low speed side (i.e., in the direction in which the pulley width increases) by the shift hydraulic actuator and the squeezing force of the secondary pulley 12 on the belt 13 is controlled by its hydraulic actuator. Thus, the belt 13 is squeezed between both pulleys 11 and 12, such that the rotation is slowed in transfer from the primary pulley 11 to the secondary pulley 12, i.e., the secondary pulley 12 rotates slower than the primary pulley 11.

In this way, rotation slowed by the stepless speed change unit 10 is output to the second connecting shaft 21 by the secondary pulley 12 and input to the sun gear S1 of the planetary gear set SP. Also at this time, the ring gear R1 rotates in the direction opposite to and slower than the sun gear S1, via the carrier CR1 which is fixed, as shown in FIG. 2(a).

When the rotary output of the engine is in the forward direction, the primary pulley 11 rotates in the forward direction about the first axis CT1 via the input shaft 2, the torque converter 3, and the first connecting shaft 5. The secondary pulley 12 which is rotated via the belt 13, the second connecting shaft 21, and the sun gear S1 also rotate in the forward direction about the second axis CT2. That is, the sun gear S1 and the second connecting shaft 21 rotate in the same direction as the direction of rotation output by the stepless speed change unit 10 (i.e., in the same direction as the rotation of the secondary pulley 12), and the ring gear R1 rotates in the direction opposite that of the rotation output by the stepless speed change unit 10 (i.e., in the direction opposite the rotation of the secondary pulley 12).

Because the forward clutch C1 and the reverse clutch C2 are released, as described above, the forward rotation of the sun gear S1 (and the second connecting shaft 21) and the reverse rotation of the ring gear R1 are not transmitted to the third connecting shaft 22. As a result, the continuously variable transmission $1_1$ is in a neutral state, with no power being transmitted to the left and right wheel axles 52r and 52l.

As shown in FIG. 2(b), when the driver moves the shift lever to the position for D (drive) range, for example, the hydraulic controller hydraulically applies the forward clutch C1, as indicated by the circle in the drawing, and releases the reverse clutch C2 (as indicated by "X" in the drawing).

As a result, the rotation of the ring gear R1, which is the reverse of and slightly slower than the rotation of the secondary pulley 12 (see FIG. 2(a)), is transmitted to the third connecting shaft 22 via the forward clutch C1, as described above. The reverse rotation of the third connecting shaft 22 is transmitted to the ring gear 51 on the third axis CT3 by the output gear 31 on the second axis CT2, where it is slowed even further, as well as reversed in direction. As a result, forward rotation, i.e., rotation in the same direction as that of the engine, is transmitted to the ring gear 51. That is, forward drive rotation is transmitted to the left and right wheel axles 52r and 52l, such that the drive wheels, not shown, are driven in the forward direction.

During forward running, and especially during power on, the carrier CR1 receives both the torque input via the stepless speed change unit 10 by the sun gear S1, and the reaction force of the torque output based on the gear ratio of the sun gear S1 and the ring gear R1 to the ring gear R1. Therefore, in order to hold the carrier CR1 stationary using a brake, the brake must be large enough to be able to withstand a relatively large amount of torque (i.e., a brake that has a large number of friction plates, that is large in diameter, and that has a large hydraulic servo, and the like, is required). In this continuously variable transmission $1_1$, however, the carrier CR1 is always fixed so that such a brake is not necessary, which enables the continuously variable transmission $1_1$ to be made more compact.

Where Ts represents the torque output by the secondary pulley 12, Zs represents the number of teeth on the sun gear S1, and Zr represents the number of teeth on the ring gear R1, the torque Tcr received by the carrier CR1 can be expressed by the equation: Tcr=(1+Zr/Zs)Ts.

In the conventional structure, during forward running, power is transmitted via the planetary gear set SP, as described above, so gear noise is generated by the planetary gear set SP. In such a conventional structure, with the forward-reverse switching mechanism arranged between the torque converter 3 and the stepless speed change unit 10, rotation at a speed that is substantially the same as the engine speed is input directly to the planetary gear set SP. In contrast, in the continuously variable transmission $1_1$ according to the present invention, however, the forward-reverse switching mechanism $20_1$ is arranged after the stepless speed change unit 10 so when the speed ratio is large, in particular during take-off of the vehicle, rotation that has been slowed by the stepless speed change unit 10 is input to the planetary gear set SP. As a result, the rotational speeds of the sun gear S1 and the ring gear R1 are relatively low so gear noise is reduced. When the speed ratio of the stepless speed change unit 10 is low, the rotational speeds of the sun gear S1 and the ring gear R1 of the planetary gear set SP are high, but in this case, the vehicle is traveling at high speed so the gear noise is relatively small compared to other noise (such as that of the engine and the tires).

Further, in contrast to the structure disclosed in JP(A) 11-159596 and JP(A) 2001-124191, for example, in which a countershaft is arranged between the output gear 31 and the differential gear unit 50, which reverses the rotation and further reduces the speed of that rotation (i.e., the rotation of the primary sheave), through a reduction gear provided on the countershaft, the continuously variable transmission $1_1$ according to this first embodiment reverses the rotation and reduces the speed of rotation of the primary sheave using the planetary gear set SP. As a result, a large amount of torque can be output to the drive wheels during take-off, even without use of a countershaft. Accordingly, the countershaft becomes unnecessary, thereby enabling the continuously variable transmission $1_1$ to be made more compact.

As shown in FIG. 2(b), when the driver moves the shift lever to the position for R (reverse) range, for example, the reverse clutch C2 is hydraulically applied (as indicated by the circle in the drawing) and the forward clutch C1 is hydraulically released (as indicated by "X" in the drawing) by a hydraulic controller, not shown. As a result, rotation of the sun gear S1, which receives the rotation of the secondary pulley 12 input via the second connecting shaft 21, is transmitted to the third connecting shaft 22 via the reverse clutch C2. That is, the second connecting shaft 21, the sun gear S1, and the third connecting shaft 22 are all directly connected. The forward rotation of the third connecting shaft 22 is then transmitted to the ring gear 51 on the third axis CT3 by the output gear 31 on the second axis CT2, where it is slowed even further and reversed in direction. As a result, reverse rotation, i.e., rotation which is in the direction opposite the direction of rotation of the engine, is transmitted to the ring gear 51. That is, reverse rotation is transmitted to the left and right wheel axles 52r and 52l so as to drive the vehicle wheels (drive wheels), not shown, in the reverse direction. With the vehicle thus traveling in reverse, the ring gear R1 rotates idly without torque acting on the sun gear S1, the carrier CR1, or the ring gear R1.

When the vehicle is traveling forward, as well as when traveling in reverse as described above, control is provided by a hydraulic controller based on control signals from an ECU, for example. The pulley width of the primary pulley 11 is controlled by the shift hydraulic actuator and the squeezing force applied to the belt by the secondary pulley 12 is controlled by its hydraulic actuator in stepless shifting.

Next, a case in which the vehicle is being towed will be described. When the vehicle is being towed while the drive wheels are in contact with the pavement and the engine is stopped, the oil pump 4 that is connected to the input shaft 2, as described above, is not driven. As a result, no hydraulic pressure is supplied by the hydraulic controller, and no lubricating oil is supplied to the continuously variable transmission $1_1$. Therefore, as shown in FIG. 2(b), when the vehicle is being towed, both the forward clutch C1 and the reverse clutch C2 are released (as indicated by the "X" in the drawing).

As a result, the left and right wheel axles 52r and 52l are rotatably driven by the vehicle drive wheels, and the third connecting shaft 22 is also rotatably driven via the differential gear unit 50, the ring gear 51, and the output gear 31. However, since both the forward clutch C1 and the reverse clutch C2 are released, rotation is not transmitted to any of the planetary gear set SP, the second connecting shaft 21, the stepless speed change unit 10, the first connecting shaft 5, the torque converter 3, or the input shaft 2. Because the planetary gear set SP and the stepless speed change unit 10 are not rotated, they are not adversely affected as they would be if rotatably driven without a supply of lubricating oil thereto. Accordingly, the durability of the continuously variable transmission $1_1$ is not adversely affected.

Next, a case in which the vehicle is stopped suddenly will be described. In the event of so-called panic braking, in which the driver applies the brake suddenly so that the vehicle stops as is, i.e., without sufficient time to adjust the speed ratio of the stepless speed change unit 10 so that the pulley widths of the primary pulley 11 and the secondary pulley 12 are in a state on the high speed side.

Typically, in a belt type stepless speed change unit 10, the pulleys 11 and 12 can be adjusted while rotating to change the speed ratio. However, when the pulleys 11 and 12 are not rotating, the frictional force of the belt 13, engaging the pulleys 11 and 12, tends to prevent a change in speed ratio. Also, even if the pulley widths of the pulleys 11 and 12 can be changed by their respective hydraulic actuators, forcing the movable sheaves of the pulleys 11 and 12 to slide against the resistance of the belt 13 accelerates wear of the pulleys 11 and 12 and the belt 13. Therefore, it is necessary to change the pulley widths while rotating the pulleys 11 and 12. However, in a conventional continuously variable transmission (CVT) in which the left and right wheel axles 52r and 52l (i.e., the vehicle drive wheels) are connected to the stepless speed change unit 10, for example, the vehicle drive wheels do not rotate (and the pulleys 11 and 12 do not rotate), unless the vehicle starts in motion so the continuously variable transmission is operating at a high speed. Also, even if the vehicle attempts to take off while the CVT is at high speed, the engine is unable to output the torque necessary for take-off, which may result in engine stalling (engine stoppage). That is, unless the vehicle drive wheels are being rotated due to, for example, the vehicle being towed, a low speed ratio cannot be established and the vehicle may not be able to run on its own power.

In contrast, the continuously variable transmission $1_1$ of the present invention, however, even if the driver executes panic braking and the vehicle comes to a stop while the stepless speed change unit 10 is still in the high speed state, the stepless speed change unit 10 can be disconnected from the left and right wheel axles 52r and 52l (i.e., the vehicle drive wheels) by moving the shift lever to the position for N range or by execution of neutral control by an electronic controller, for example. Thereafter, the stepless speed change unit 10 can be changed to the low speed side while rotating the pulleys 11 and 12 using the rotary output of the engine.

As described above, the continuously variable transmission $1_1$ of the first embodiment of the present invention includes, in the following order, the input shaft 2, the stepless speed change unit 10, the forward-reverse switching mechanism $20_1$, and the left and right wheel axles 52r and 52l, through which power from the engine is transmitted in that order. The forward-reverse switching mechanism 20, includes the planetary gear set SP, the reverse clutch C2, and the forward clutch C1. The planetary gear set SP, in turn, includes the sun gear S1 which rotates in the same direction as the rotation output from the stepless speed change unit 10, the carrier CR1 which is always fixed, and the ring gear R1 which rotates in a direction which is the reverse of the rotation output from the stepless speed change unit 10. The reverse clutch C2 is disposed between the sun gear S1 and the left and right wheel axles 52r and 52l, and the forward clutch C1 is disposed between the ring gear R1 and the left and right wheel axles 52r and 52l. This structure enables the transmission of power between the stepless speed change unit 10 and the left and right wheel axles 52r and 52l to be interrupted by the forward clutch C1 and the reverse clutch C2 when the vehicle is stopped suddenly or is being towed, for example. Also, even if the vehicle is stopped, it is still possible to return the pulleys 11 and 12 of the stepless speed change unit 10 to the low speed side while they are being rotatably driven, and to prevent the stepless speed change unit 10 from being rotated while the vehicle is being towed. As a result, it is no longer necessary to provide a separate clutch for interrupting power transmission, which is advantageous for several reasons. For example, it enables the continuously variable transmission $1_1$ to be made more compact. It also enables costs to be reduced due to fewer components being used, as well as reducing the complexity of the control. In addition, the carrier CR1 of the planetary gear set SP is always fixed which obviates the need to provide a large brake, thus enabling the continuously variable transmission $1_1$ to be made yet more compact.

Furthermore, the input shaft 2 and the primary pulley 11 of the stepless speed change unit 10 are both arranged on the first axis CT1, the secondary pulley 12 of the stepless speed change unit 10 and the forward-reverse switching mechanism $20_1$ are arranged on the second axis CT2 which is in parallel with the first axis CT1, and the left and right wheel axles 52r and 52l are arranged on the third axis CT3 that is in parallel with the first axis CT1 and the second axis CT2. The forward clutch C1 is applied in forward travel, and the reverse clutch C2 is applied in reverse travel. As a result, forward or reverse rotation is output to the left and right wheel axles 52r and 52l without provision of a countershaft, thus enabling the continuously variable transmission $1_1$ to be made more compact.

Moreover, the planetary gear set SP is a single pinion planetary gear set, with the rotation from the stepless speed change unit 10 being input to the sun gear S1, the carrier CR1 being fixed, and the ring gear R1 rotating in reverse. Therefore, during forward travel, slower rotation in the reverse direction can be output by the ring gear R1, so that a countershaft is not necessary to produce slower rotation in reverse. Thus, the continuously variable transmission $1_1$ can be made more compact while a large amount of torque can be output at times such as during take-off for forward travel.

Second Embodiment

Next, a second embodiment which is a modification of the first embodiment will be described with reference to FIGS. 3 and 4. Features of the second embodiment that are the same as those of the first embodiment are denoted by like reference numerals and description thereof will not be repeated here.

Figure 3:
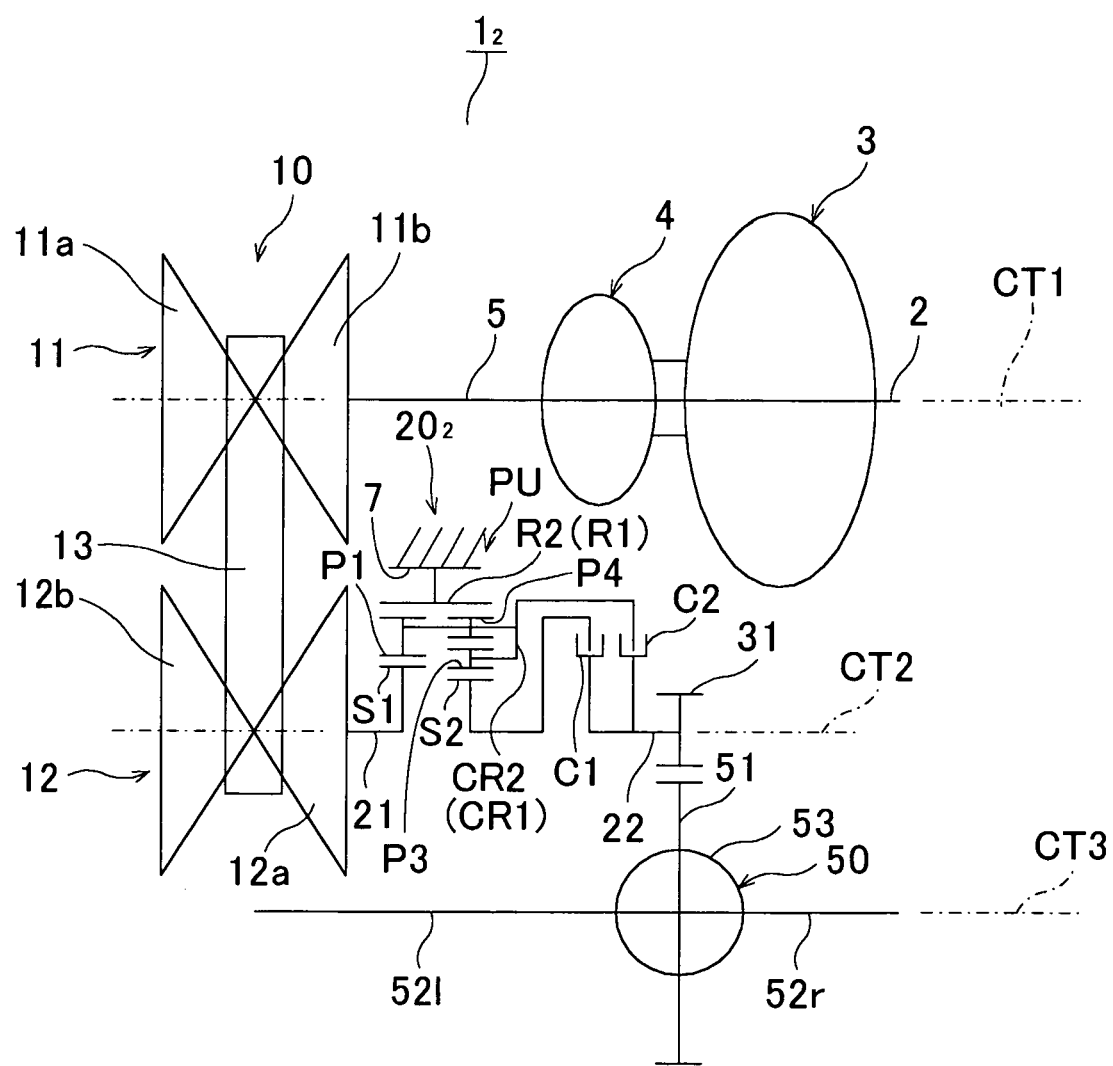
FIG. 3 is a skeletal view of a continuously variable transmission according to a second embodiment of the present invention.
Figure 4:
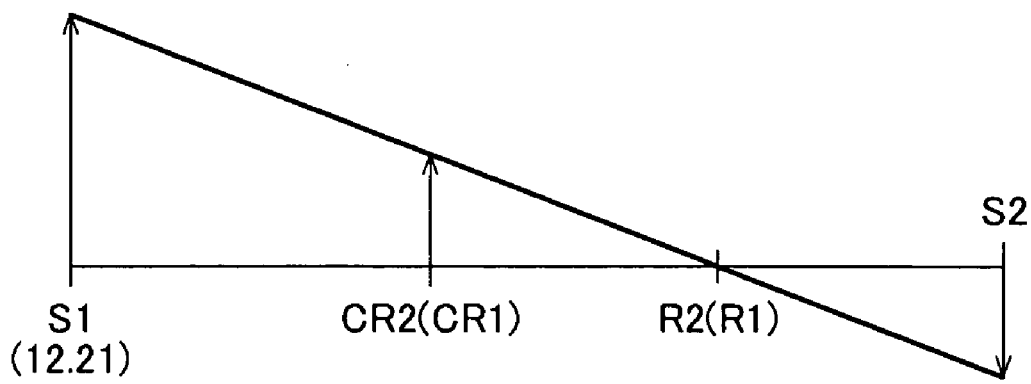
FIG. 4(a) is a velocity diagram for the forward-reverse switching mechanism of the second embodiment.
FIG. 4(b) is an application chart for clutches C1 and C2 in the second embodiment.

As shown in FIG. 3, the continuously variable transmission $1_2$ of the second embodiment differs from the continuously variable transmission $1_1$ of the first embodiment in that the forward-reverse switching mechanism 20 has been modified. FIG. 3 shows a forward-reverse switching mechanism $20_2$ as including a second connecting shaft 21 which is connected to a secondary pulley 12, a planetary gear unit (gear mechanism) PU, a forward clutch (second clutch) C1, a reverse clutch (first clutch) C2, and a third connecting shaft 22 that is connected to an output gear 31. The planetary gear unit PU is a so-called ravigneaux type planetary gear set which includes a first sun gear S1, a second sun gear (a reverse-direction rotary element) S2, a ring gear (a fixed element) R2 (R1), and a carrier (same-direction rotary element) CR2 (CR1) which has a long pinion gear P4 in mesh with both the sun gear S1 and the ring gear R1, and a short pinion gear P3 in mesh with both the long pinion gear P4 and the second sun gear S2.

The first sun gear S1 of the planetary gear unit PU is connected to the second connecting shaft 21, and the ring gear R1 is always fixed to case 7. The reverse clutch C2 is disposed between the carrier CR2 and the third connecting shaft 22 which is connected to the output gear 31, and the forward clutch C1 is disposed between the second sun gear S2 and the third connecting shaft 22.

Next, operation of the continuously variable transmission $1_2$ will be described. As shown in FIG. 4(b), when the driver moves the shift lever to the position for N (neutral) range, for example, the forward clutch C1 and the reverse clutch C2 are hydraulically released (indicated as "X" in FIG. 4(b)) by a hydraulic controller.

When the engine is running, rotation from the engine is input to the input shaft 2 and the primary pulley 11 is rotatably driven via the torque converter 3 and the first connecting shaft 5. Also, the pulley width of the primary pulley 11 is controlled to the low speed side (i.e., in the direction in which the pulley width increases) by its hydraulic actuator, and the squeezing force of the secondary pulley 12 is controlled by its hydraulic actuator. Thus, the belt 13 is squeezed by both pulleys 11 and 12, so that the rotation is slowed in transmission from the primary pulley 11 to the secondary pulley 12. In other words, the secondary pulley 12 rotates slower than the primary pulley 11. Rotation slowed by the stepless speed change unit 10 in this manner is output to the second connecting shaft 21 from the secondary pulley 12 and input to the first sun gear S1 of the planetary gear unit PU. Also at this time, the carrier CR2 rotates slower than the first sun gear S1 due to the ring gear R2 being fixed, and the second sun gear S2 rotates in the opposite direction and slower than the first sun gear S1 due to the ring gear R2 being fixed and the carrier CR2 rotating at a slower speed, as shown in FIG. 4(a).

When the rotation output from the engine is in the forward direction, the primary pulley 11 rotates in the forward direction about the first axis CT1 via the input shaft 2, the torque converter 3, and the first connecting shaft 5. The secondary pulley 12 which is rotatably driven via the belt 13, the second connecting shaft 21, and the sun gear S1 also rotate in the forward direction about the second axis CT2. That is, the carrier CR2 rotates in the same direction as the rotation output by the stepless speed change unit 10, i.e., in the same direction as the rotation of the secondary pulley 12, and the second sun gear S2 rotates in the direction opposite that of the rotation output from the stepless speed change unit 10, i.e., in the direction opposite that of the rotation of the secondary pulley 12.

Because the forward clutch C1 and the reverse clutch C2 are released, as described above, the reverse rotation of the second sun gear S2 and the forward rotation of the carrier CR2 are not transmitted to the third connecting shaft 22 and the continuously variable transmission $1_2$ is in a neutral state, with no power transmitted to the left and right wheel axles 52r and 52l.

As further shown in FIG. 4(b), when the driver moves the shift lever to the position for D (drive) range, for example, the hydraulic controller, not shown, causes the forward clutch C1 to engage (as indicated by the circle in the drawing) and the reverse clutch C2 to release (as indicated by "X" in the drawing). As a result, the rotation of the second sun gear S2, which is the reverse of and slower than the rotation of the secondary pulley 12 (see FIG. 4(a)), is transmitted to the third connecting shaft 22 via the forward clutch C1, as described above. The reverse rotation of the third connecting shaft 22 is transmitted to the ring gear 51 on the third axis CT3 by the output gear 31 on the second axis CT2, where it is slowed even further as well as reversed in direction. As a result, forward rotation, i.e., rotation in the same direction as that of the engine, is transmitted to the ring gear 51. That is, forward drive rotation is transmitted to the left and right wheel axles 52r and 52l, so that the drive wheels, not shown, are driven in the forward direction.

During forward running, and especially during power on, the ring gear R1 receives both the torque input via the stepless speed change unit 10 by the first sun gear S1, and the reaction force of the torque output, based on the gear ratio of the first sun gear S1, the carrier CR2, and the ring gear R2, to the second sun gear S2. Therefore, in order to hold the ring gear R1 stationary using a brake, conventionally the brake must be sufficiently large to be able to withstand a relatively large amount of torque, i.e., a brake that has a large number of friction plates, that is large in diameter, and that has a large hydraulic servo. In contrast, in the continuously variable transmission $1_2$ of this second embodiment, the ring gear R1 is always fixed so that a large brake is not necessary, which enables the continuously variable transmission $1_2$ to be made more compact.

Where Ts represents the torque output by the secondary pulley 12, Zs1 represents the number of teeth on the first sun gear S1, Zs2 represents the number of teeth on the second sun gear S2, and Zr represents the number of teeth on the ring gear R2, the torque Tr received by the ring gear R2 can be expressed by the equation: Tr=(1+(Zs1+Zr)/Zs1'Zs2/(Zr−Zs1))Ts.

On the other hand, as shown in FIG. 4(b), when a driver moves the shift lever to the position for R (reverse) range, the reverse clutch C2 is hydraulically applied and the forward clutch C1 is hydraulically released (indicated as "X" in the drawing) by a hydraulic controller, not shown. As a result, the rotation of the carrier CR2, which is in the forward direction and slightly slower than the rotation of the secondary pulley 12 (see FIG. 4(a)), is transmitted to the third connecting shaft 22 via the reverse clutch C2, as described above. The slowed rotation in the forward direction of the third connecting shaft 22 is transmitted to the ring gear 51 on the third axis CT3 by the output gear 31 on the second axis CT2, where it is slowed even further as well as reversed in direction. As a result, reverse rotation, i.e., rotation in the direction opposite that of the engine, is transmitted to the ring gear 51. Thus, reverse direction rotation is transmitted to the left and right wheel axles 52r and 52l, such that the vehicle drive wheels are driven in the reverse direction.

Thus, when the vehicle is traveling forward, as well as when it is traveling in reverse, the continuously variable transmission is operated under control of a hydraulic controller based on control signals from an ECU. The pulley width of the primary pulley 11 is controlled by its hydraulic actuator for shifting and the squeezing force of the secondary pulley 12 on the belt is controlled by its hydraulic actuator so that a stepless shift is performed.

Also, when running in forward as well as when running in reverse, power is transmitted via the planetary gear unit PU, as described above, so that gear noise is generated by the planetary gear unit PU. For example, if the forward-reverse switching mechanism is arranged between the torque converter 3 and the stepless speed change unit 10, rotation at a speed that is substantially the same as the engine speed is input directly to the planetary gear unit PU. However, in the continuously variable transmission $1_2$ according to this second embodiment, the forward-reverse switching mechanism $20_2$ is arranged after the stepless speed change unit 10 so when the speed ratio is large, such as during take-off of the vehicle (start of forward running), in particular, rotation that has been slowed by the stepless speed change unit 10 is input to the planetary gear unit PU and, as a result, the rotational speeds of the first sun gear S1, the second sun gear S2, and the carrier CR2 are relatively low so that gear noise is reduced. When the speed ratio of the stepless speed change unit 10 is low, the rotational speeds of the first sun gear S1, the second sun gear S2, and the carrier CR2 of the planetary gear unit PU are higher, but in this case, the vehicle is traveling at high speed so the gear noise is relatively small compared to other noise such as the engine noise and tire noise.

Again, in contrast to the structures disclosed in JP(A) 11-159596 and JP(A) 2001-124191, for example, in which a countershaft is arranged between the output gear 31 and the differential gear unit 50, which further reduces the speed of the rotation (of the primary sheave), though use of a reduction gear provided on the countershaft, the continuously variable transmission $1_2$ of this second embodiment slows the rotation of the secondary pulley 12 in both forward and reverse, using the planetary gear unit PU. As a result, a large amount of torque can be output to the vehicle drive wheels during take-off, even without a countershaft, thus eliminating need for a countershaft and enabling the continuously variable transmission $1_2$ to be made more compact.

Also, similar to the first embodiment, as shown in FIG. 4(b), the forward clutch C1 and the reverse clutch C2 are both released (indicated as "X" in the drawing) when the vehicle is being towed. As a result, rotation is not transmitted to any of the planetary gear set PU, the second connecting shaft 21, the stepless speed change unit 10, the first connecting shaft 5, the torque converter 3, the input shaft 2, and the engine. That is, the planetary gear set PU and the stepless speed change unit 10 are not rotated, and are thereby protected from the excessive wear they would suffer if rotatably driven without lubricating oil being supplied thereto. Accordingly, it is possible to enhance the durability of the continuously variable transmission $1_2$.

Also, similar to the first embodiment, even if the vehicle is suddenly stopped, i.e., even if the driver performs panic braking and the vehicle comes to a sudden stop while the stepless speed change unit 10 is still in the high speed state, as described above, the stepless speed change unit 10 can be disconnected from the left and right wheel axles 52r and 52l (and from the vehicle drive wheels) by moving the shift lever to the position for N range or by execution of neutral control by an electronic control unit. Thereafter, the stepless speed change unit 10 can be changed to the low speed side while the pulleys 11 and 12 are rotatably driven by the engine.

As described above, in the continuously variable transmission $1_2$ of the second embodiment, power output from the engine is transmitted in the following sequence: the input shaft 2, the stepless speed change unit 10, the forward-reverse switching mechanism $20_2$, and the left and right wheel axles 52r and 52l. The forward-reverse switching mechanism $20_2$ of this second embodiment includes the planetary gear unit PU, the reverse clutch C2, and the forward clutch C1. The planetary gear unit PU, in turn, includes the carrier CR2 which rotates in the same direction as the rotation output from the stepless speed change unit 10, a ring gear R1 which is always fixed, and a second sun gear S2 which rotates in a direction which is the reverse of the rotation output from the stepless speed change unit 10. The reverse clutch C2 is disposed between the carrier CR2 and the left and right wheel axles 52r and 52l, and the forward clutch C1 is disposed between the second sun gear S2 and the left and right wheel axles 52r and 52l. This structure enables the transmission of power between the stepless speed change unit 10 and the left and right wheel axles 52r and 52l to be interrupted by the forward clutch C1 and the reverse clutch C2 when the vehicle is stopped suddenly or is being towed, for example. Also, even if the vehicle is stopped, it is still possible to return the pulleys 11 and 12 of the stepless speed change unit 10 to the low speed side while they are being rotatably driven, as well as to prevent the stepless speed change unit 10 from being rotated while the vehicle is being towed. As a result, it is no longer necessary to provide a separate clutch for interrupting power transmission, which is advantageous because it enables the continuously variable transmission $1_2$ to be made more compact, it enables costs to be reduced due to use of fewer components and it reduces the complexity of the control. In addition, because the ring gear R1 of the planetary gear unit PU is always fixed, the need for a large brake is eliminated, thus enabling the continuously variable transmission $1_2$ to be made more compact.

The input shaft 2 and the primary pulley 11 of the stepless speed change unit 10 are both arranged on the first axis CT1, the secondary pulley 12 of the stepless speed change unit 10 and the forward-reverse switching mechanism $20_2$ are arranged on the second axis CT2 which is in parallel with the first axis CT1, the left and right wheel axles 52r and 52l are arranged on the third axis CT3 which is in parallel with the first axis CT1 and the second axis CT2. Combined with a forward clutch C1 which is applied in forward travel, and the reverse clutch C2 which is applied in reverse travel, this structure is able to output forward or reverse rotation to the left and right wheel axles 52r and 52l without provision of a countershaft. Elimination of a countershaft enables the continuously variable transmission $1_2$ to be made more compact.

Moreover, the planetary gear unit PU is a ravigneaux type planetary gear set, with the rotation from the stepless speed change unit 10 being input to the first sun gear S1, the ring gear R1 being fixed, the carrier CR2 rotating slower than and in the same direction as the stepless speed change unit 10, and the second sun gear S2 rotating in the direction opposite that of the rotation output from the stepless speed change unit 10. Therefore, in forward travel, slowed reverse rotation can be output by the second sun gear S2, and in reverse travel, slowed forward rotation can be output by the carrier CR2, so that it is no longer necessary to provide a countershaft for the purpose of slowing rotation. Thus, the continuously variable transmission $1_2$ of the second embodiment can be made more compact while a large amount of torque can be output at times such as during take-off for forward travel.

Third Embodiment

Next, a third embodiment which is a modification of the first embodiment will be described with reference to FIGS. 5 and 6. Features of the third embodiment that are the same as those of the first embodiment are denoted by like reference numerals and description thereof will not be repeated here.

The continuously variable transmission $1_3$ of the third embodiment differs from that of the first embodiment in that the forward-reverse switching mechanism 20 has been modified and a countershaft 40 has been added.

Figure 5:
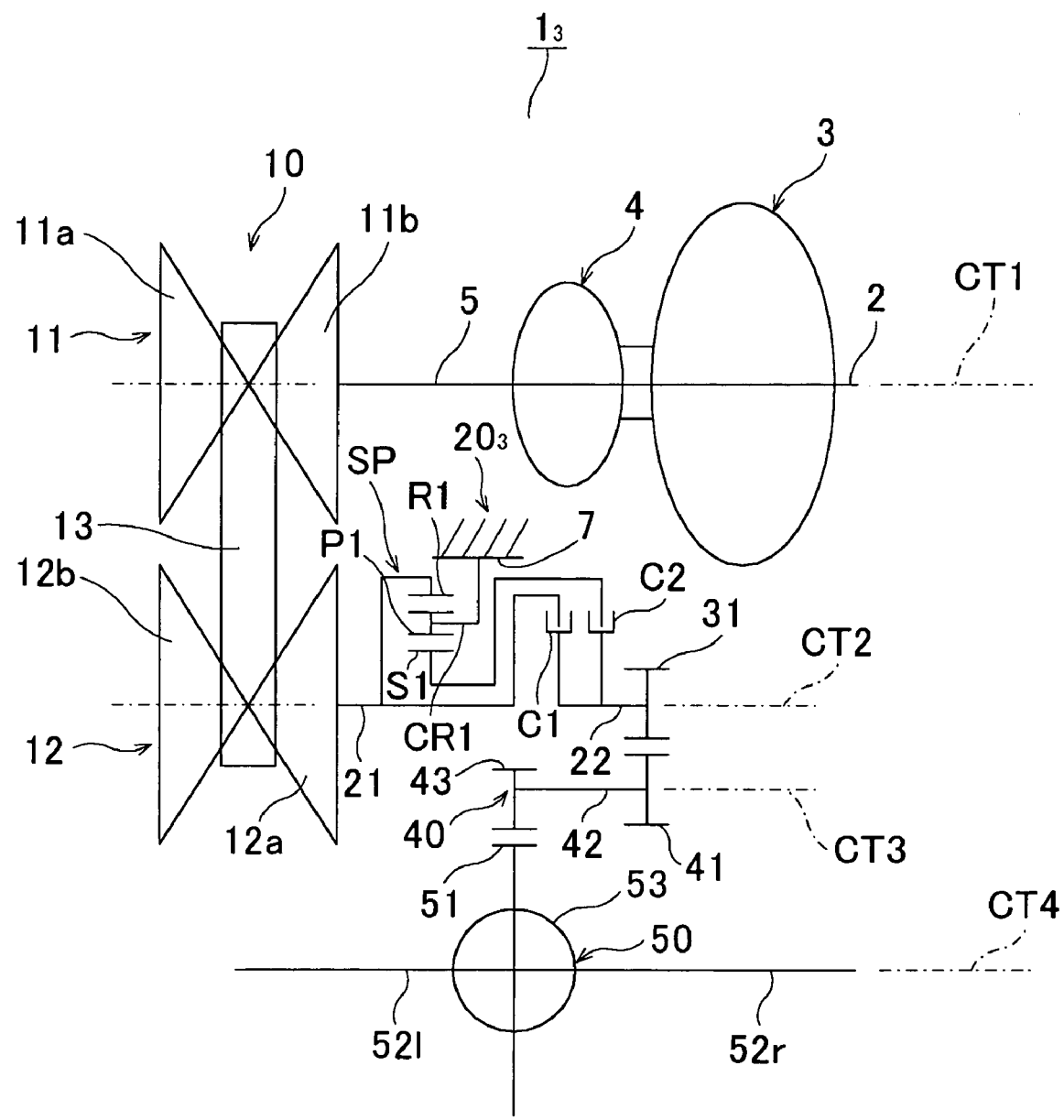
FIG. 5 is a skeletal view of a continuously variable transmission according to a third embodiment of the present invention.
Figure 6:
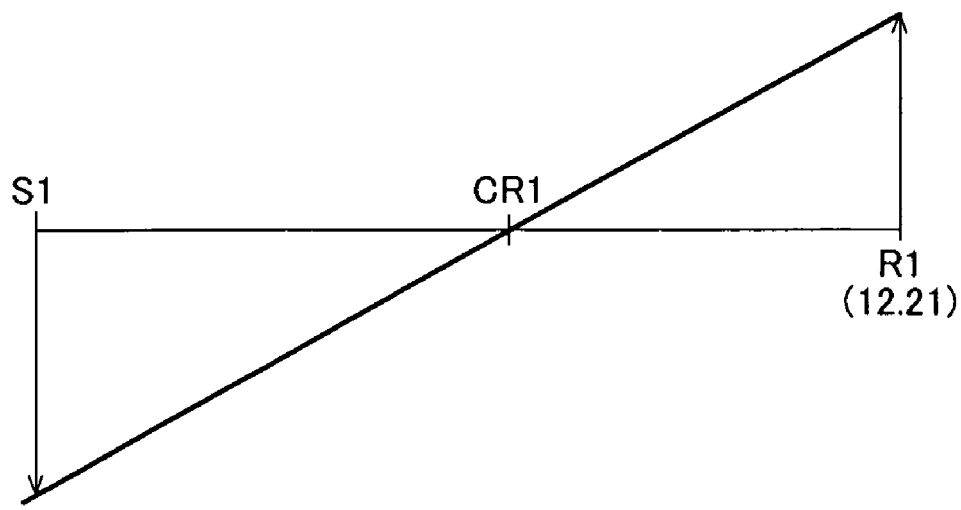
FIG. 6(a) is a velocity diagram for the forward-reverse switching mechanism of the third embodiment.
FIG. 6(b) is an application chart for clutches C1 and C2 in the third embodiment.

As shown in FIG. 5, the forward-reverse switching mechanism $20_3$ includes a second connecting shaft 21 that is connected to a secondary pulley 12, a planetary gear set (gear mechanism) SP, a forward clutch (first clutch) C1, a reverse clutch (second clutch) C2, and a third connecting shaft 22 that is connected to an output gear 31. In addition, a countershaft 40 is provided between the output gear 31 and a ring gear 51 mounted on differential gear unit 50.

The input shaft 2 which is connected to a crankshaft of an engine, not shown, a torque converter 3 (and an oil pump 4), first connecting shaft 5, and the primary pulley 11 are all aligned and arranged on a first axis CT1. Similarly, the secondary pulley 12, the forward-reverse switching mechanism 20₃, and the output gear 31 are all aligned and arranged on a second axis CT2. The countershaft 40 is arranged on a third axis CT3, and left and right wheel axles 52r and 52l of the differential gear unit 50 are arranged on a fourth axis CT4. These four axes, i.e., the first axis CT1, the second axis CT2, the third axis CT3, and the fourth axis CT4, are all in parallel with one another.

The planetary gear set SP is a so-called single pinion planetary gear set which includes a sun gear (second or "reverse" rotary element) S1, a ring gear (first rotary element) R1, and a carrier (fixed element) CR1 which has a single pinion gear P1 in mesh with both the sun gear S1 and the ring gear R1. The ring gear R1 of the planetary gear set SP is connected to the second connecting shaft 21 and the carrier CR1 is always fixed to case 7. The forward clutch C1 is disposed between the ring gear R1 and the second connecting shaft 21, and the third connecting shaft 22 that is connected to the output gear 31. The reverse clutch C2 is disposed between the sun gear S1 and the third connecting shaft 22.

Further, the countershaft mechanism 40 includes a countershaft 42 disposed so as to rotate freely about the third axis CT3. A large diameter gear 41 in mesh with the output gear 31 is mounted fixed on one end of the countershaft 42 and a small diameter gear 43 in mesh with the ring gear 51 is mounted fixed on the other end of the countershaft 42.

Operation of the continuously variable transmission 1₃ of this third embodiment will now be described with reference to FIG. 6(b). As shown in FIG. 6(b), when a driver moves the shift lever to the position for N (neutral) range, for example, the forward clutch C1 and the reverse clutch C2 are hydraulically released (as indicated by "X" in the drawing) by a hydraulic controller, not shown.

At this time, when the engine is running, driving rotation from the engine is input to the input shaft 2 and the primary pulley 11 is rotatably driven via the torque converter 3 and the first connecting shaft 5. Also, the pulley width of the primary pulley 11 is adjusted to the low speed side, i.e., the pulley width is increased, by its hydraulic actuator, and the squeezing force of the secondary pulley 12 on the belt is controlled by its hydraulic actuator. Thus, the belt 13 is squeezed between both pulleys 11 and 12, such that the rotation is slowed in transmission from the primary pulley 11 to the secondary pulley 12, i.e., the secondary pulley 12 rotates slower than the primary pulley 11.

Rotation slowed by the stepless speed change unit 10 in this manner is output to the second connecting shaft 21 from the secondary pulley 12 and is input to the ring gear R1 of the planetary gear set SP. Also at this time, the sun gear S1 rotates in a direction the opposite of and slightly faster than the ring gear R1 via the carrier CR1 which is fixed, as shown in FIG. 6(a).

When the engine output rotation is in the forward direction, the primary pulley 11 rotates in the forward direction about the first axis CT1 via the input shaft 2, the torque converter 3, and the first connecting shaft 5. The secondary pulley 12 which is driven via the belt 13, the second connecting shaft 21, and the ring gear R1 also rotate in the forward direction about the second axis CT2. That is, the ring gear R1 and the second connecting shaft 21 rotate in the same direction as the rotation output by the stepless speed change unit 10, i.e., in the same direction as the rotation of the secondary pulley 12, and the sun gear S1 rotates in a direction the opposite that of the rotation output by the stepless speed change unit 10, i.e., in a direction the opposite of the direction of the rotation of the secondary pulley 12.

Because the forward clutch C1 and the reverse clutch C2 are released, as described above, neither the forward rotation of the ring gear R1 (and that of the second connecting shaft 21) nor the reverse rotation of the sun gear S1 is transmitted to the third connecting shaft 22. As a result, the continuously variable transmission 1₃ is in a neutral state, with no power being transmitted to the left and right wheel axles 52r and 52l.

Further, as shown in FIG. 6(b), when the driver moves the shift lever to the position for the D (drive) range, the hydraulic controller applies the forward clutch C1 (as indicated by the circle in the drawing) and releases the reverse clutch C2 (as indicated by the "X" in the drawing). As a result, the secondary connecting shaft 21 is rotatably driven by the secondary pulley 12 and, in turn, drives the ring gear R1 and, through engagement of the forward clutch C1, the third connecting shaft 22. In other words, the second connecting shaft 21, the ring gear R1, and the third connecting shaft 22 are all directly connected. Further, the forward rotation of the third connecting shaft 22 is transmitted to the large diameter gear 41 of the countershaft mechanism 40 by the output gear 31 on the second axis CT2. The countershaft 42 rotates about the third axis CT3 in the reverse direction and at a slower speed determined by the gear ratio of the output gear 31 to the large diameter gear 41. The slowed reverse rotation of the countershaft 42 is then transmitted to the ring gear 51 on the fourth axis CT4, where it is slowed even further to a speed determined by the gear ratio of the small diameter gear 43 to the ring gear 51, as well as reversed in direction again. As a result, forward rotation, i.e., rotation in the same direction as that of the engine, is transmitted to the ring gear 51. Thus, forward drive rotation is transmitted to the left and right wheel axles 52r and 52l, so that the vehicle drive wheels are driven in the forward direction. When the vehicle is traveling forward in this way, the sun gear S1 receives no torque and rotates idly. Likewise, no torque is transferred to the carrier CR1 or the ring gear R1.

On the other hand, as shown in FIG. 6(b), when a driver moves the shift lever to the R (reverse) range, the reverse clutch C2 is applied (indicated by the circle in the drawing) and the forward clutch C1 is released (as indicated by the "X" in the drawing) by a hydraulic controller, not shown. As a result, the rotation of the sun gear S1, which is the reverse of and slightly faster than the rotation of the secondary pulley 12 (see FIG. 6(a)), is transmitted to the third connecting shaft 22 via the reverse clutch C2. The reverse rotation of the third connecting shaft 22 is transmitted to the large diameter gear 41 of the countershaft mechanism 40 by the output gear 31 on the second axis CT2. The countershaft 42 is thereby rotated in the forward direction about the third axis CT3 at a slower speed determined by the gear ratio of the output gear 31 to the large diameter gear 41. This slowed forward rotation of the countershaft 42 is transmitted to the ring gear 51 on the fourth axis CT4, where it is slowed even further to a speed determined by the gear ratio of the small diameter gear 43 to the ring gear 51, as well as reversed in direction. As a result, reverse rotation, i.e., rotation in the direction opposite that of the engine, is transmitted to the ring gear 51 and thereby to the left and right wheel axles 52r and 52l, such that the vehicle drive wheels are driven in the reverse direction.

When running in reverse, and especially during power on, the carrier CR1 receives both the torque input via the stepless speed change unit 10 through the ring gear R1, and the torque of the reaction force determined by the gear ratio of the ring gear R1 and the sun gear S1 to the sun gear S1, just as in the first embodiment. Again, conventionally, a larger brake would be required to hold the carrier CR1 stationary. However, in this continuously variable transmission $1_3$ of the third embodiment the carrier CR1 is always fixed so that such of a brake is not necessary, which enables the continuously variable transmission $1_3$ to be made more compact as in the previously described embodiments.

Where Ts represents the torque output by the secondary pulley 12, Zs the number of teeth on the sun gear S1, and Zr the number of teeth on the ring gear R1, the torque Tcr received by the carrier CR1 can be expressed by the equation: $Tcr=(1+Zs/Zr)Ts$.

Likewise, when running in reverse, power is transmitted via the planetary gear set SP, as described above, so that gear noise is generated by the planetary gear set SP. If, for example, the forward-reverse switching mechanism were to be located between the torque converter 3 and the stepless speed change unit 10, rotation at a speed substantially the same as the engine speed would be input directly to the planetary gear set SP and the gear noise level would correspond to that speed. However, in the continuously variable transmission $1_3$ according to this third embodiment, the forward-reverse switching mechanism $20_3$ is arranged after the stepless speed change unit 10, so that when the speed ratio is large, such as during take-off of the vehicle, in particular, rotation that has been slowed by the stepless speed change unit 10 is input to the planetary gear set SP. As a result, because the rotational speeds of the sun gear S1 and the ring gear R1 are relatively low, gear noise is reduced.

When the vehicle is traveling in reverse, as well as when it is traveling forward, hydraulic control is provided by a hydraulic controller, based on control signals from an ECU, for example. In stepless shifting, the pulley width of the primary pulley 11 is controlled/adjusted by its hydraulic actuator and the squeezing force on the belt 13 applied by the secondary pulley 12 is controlled/adjusted by its hydraulic actuator.

Similar to the first embodiment, when the vehicle is being towed, as shown in FIG. 6(b), the forward clutch C1 and the reverse clutch C2 are both released (as indicated by "X" in the drawing). As a result, rotation is not transmitted to any of the planetary gear set SP, the second connecting shaft 21, the stepless speed change unit 10, the first connecting shaft 5, the torque converter 3, the input shaft 2, and the engine. Because the planetary gear set SP and the stepless speed change unit 10 are not rotated, the adverse affect of being rotatably driven without supply of lubricating oil thereto is avoided. Accordingly, the durability of the continuously variable transmission $1_3$ is improved.

As in the first embodiment, even if the vehicle stops suddenly, i.e., even if the driver performs panic braking and the vehicle comes to a sudden stop while the stepless speed change unit 10 is still on the high speed side, as described above, the stepless speed change unit 10 can be disconnected from the left and right wheel axles 52r and 52l (i.e., the vehicle drive wheels) by moving the shift lever to the position for the N range or by electronic neutral control. Thereafter, the stepless speed change unit 10 can be changed to the low speed side while the pulleys 11 and 12 are being rotatably driven by the engine.

As described above, in the third embodiment, power from the engine passes through, in order, the input shaft 2, the stepless speed change unit 10, the forward-reverse switching mechanism $20_3$, and the left and right wheel axles 52r and 52l. Further, the forward-reverse switching mechanism $20_3$ of the third embodiment includes the planetary gear set SP, the reverse clutch C2, and the forward clutch C1. The planetary gear set SP includes the ring gear R1 that rotates in the same direction as the rotation output from the stepless speed change unit 10, the carrier CR1 which is always fixed, and the sun gear S1 which rotates in the direction opposite that of the rotation output from the stepless speed change unit 10. The reverse clutch C2 is disposed between the sun gear S1 and the left and right wheel axles 52r and 52l, and the forward clutch C1 is disposed between the ring gear R1 and the left and right wheel axles 52r and 52l. This structure enables the transmission of power between the stepless speed change unit 10 and the left and right wheel axles 52r and 52l to be interrupted by the forward clutch C1 and the reverse clutch C2 when the vehicle is stopped suddenly or is being towed, for example. Also, even if the vehicle is stopped, it is still possible to return the pulleys 11 and 12 of the stepless speed change unit 10 to the low speed side while they are being rotatably driven, as well as to prevent the stepless speed change unit 10 from being rotated while the vehicle is being towed. As a result, it is no longer necessary to provide a separate clutch for interrupting power transmission or a large brake for stopping the carrier CR1, which features are advantageous for the same reasons previously mentioned in connection with the first and second embodiments.

A countershaft mechanism 40 is disposed between the forward-reverse switching mechanism $20_3$ and the left and right wheel axles 52r and 52l. The input shaft 2 and the primary pulley 11 of the stepless speed change unit 10 are both arranged on the first axis CT1. The secondary pulley 12 of the stepless speed change unit 10 and the forward-reverse switching apparatus $20_3$ are arranged on the second axis CT2 which is in parallel with the first axis CT1, and the countershaft mechanism 40 is arranged on the third axis CT3 that is in parallel with the first axis CT1 and the second axis CT2. The left and right wheel axles 52r and 52l are arranged on the fourth axis CT4 which is in parallel with the first axis CT1, the second axis CT2, and the third axis CT3. The forward clutch C1 is applied in forward travel, and the reverse clutch C2 is applied during reverse travel. This structure enables forward or reverse rotation to be output to the left and right wheel axles 52r and 52l, while a sufficiently large amount of torque can be output for take-off in reverse as well as in forward due to the fact that reduction gears, which include the large diameter gear 41 and the small diameter gear 43, are included in the countershaft mechanism 40.

Moreover, rotation of the secondary pulley 12 is reversed by the countershaft mechanism 40, not by the planetary gear set SP. Therefore, when forward rotation is output to the left and right wheel axles 52r and 52l, power can be transmitted without passing through the planetary gear set SP. As a result, the gear noise can be reduced, thereby quieting forward running.

The planetary gear set SP is a single pinion planetary gear set, with rotation from the stepless speed change unit 10 being input to the ring gear R1, the carrier CR1 being fixed, and the sun gear S1 rotating in reverse. As a result, when running in reverse, reverse rotation can be output by the sun gear S1, such that reverse rotation is output to the left and right wheel axles 52r and 52l via the countershaft mechanism 40. Also, the sun gear S1 outputs a faster reverse rotation, which enables suitable torque to be output to the left and right wheel axles 52r and 52l, particularly when running in reverse where sudden acceleration is not necessary.

Fourth Embodiment

Figure 7:
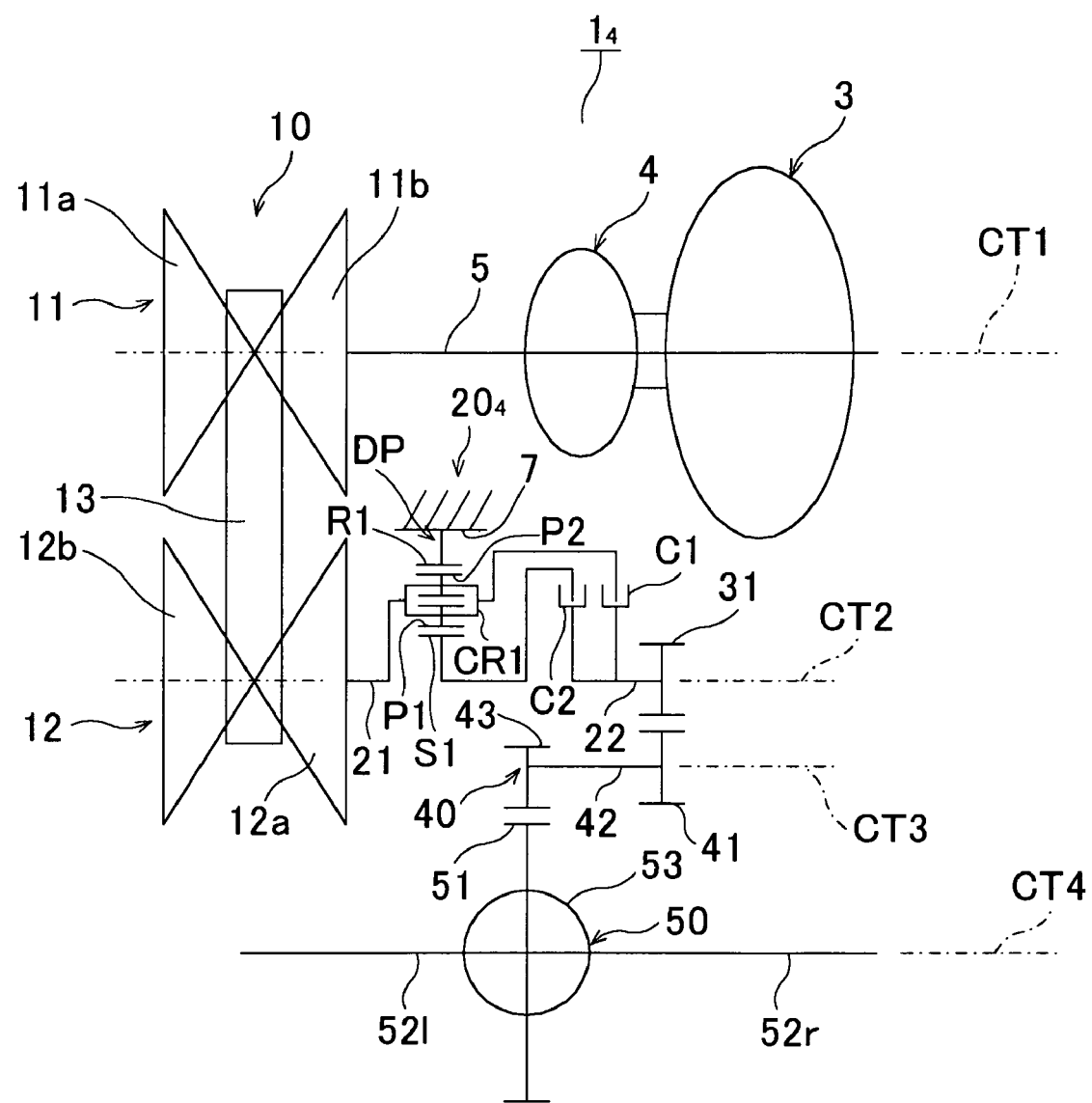
FIG. 7 is a skeletal view of a continuously variable transmission according to a fourth embodiment of the present invention.
Figure 8:
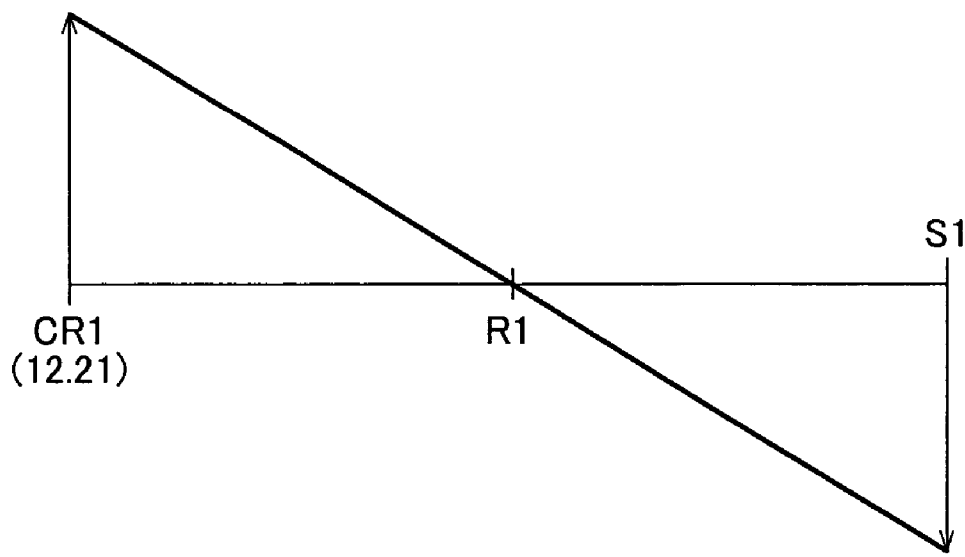
FIG. 8(a) is a velocity diagram for the forward-reverse switching mechanism of the fourth embodiment.
FIG. 8(b) is an application chart for clutches C1 and C2 in the fourth embodiment.

Next, a fourth embodiment, which is a partial modification of the third embodiment, will be described with reference to FIGS. 7 and 8. Features of the fourth embodiment which are the same as in the third embodiment are denoted by like reference numerals and description thereof will not be repeated here.

The continuously variable transmission $1_4$ of the fourth embodiment differs from the continuously variable transmission $1_3$ of the third embodiment in that the forward-reverse switching mechanism 20 has been modified. As shown in FIG. 7, forward-reverse switching mechanism $20_4$ includes a second connecting shaft 21 that is connected to a secondary pulley 12, a planetary gear set (gear mechanism) DP, a forward clutch (first clutch) C1, a reverse clutch (second clutch) C2, and a third connecting shaft 22 that is connected to an output gear 31. A countershaft mechanism 40 is also provided between the output gear 31 and a ring gear 51 of a differential gear unit 50, just as in the third embodiment.

An input shaft 2 which is connected to a crankshaft of an engine, not shown, a torque converter 3 (and an oil pump 4), a first connecting shaft 5, and a primary pulley 11 are all aligned and arranged on a first axis CT1. Similarly, the secondary pulley 12, the forward-reverse switching mechanism $20_4$, and the output gear 31 are all aligned and arranged on a second axis CT2. The countershaft mechanism 40 is arranged on a third axis CT3, and the left and right wheel axles 52r and 52l of the differential gear unit 50 are arranged on a fourth axis CT4. These four axes, i.e., the first axis CT1, the second axis CT2, the third axis CT3, and the fourth axis CT4, are all in parallel with one another.

The planetary gear set DP is a double pinion planetary gear set which includes a sun gear (second rotary element) S1, a ring gear (fixed element) R1, and a carrier (first rotary element) CR1 which has a first pinion gear P1 and a second pinion gear P2, the first pinion gear P1 being in mesh with the sun gear S1 and the second pinion gear P2, and the second pinion gear P2 being in mesh with the ring gear R1 and the first pinion gear P1. The carrier CR1 of the planetary gear set DP is connected to the second connecting shaft 21 and the ring gear R1 remains always fixed to case 7. The forward clutch C1 is disposed between the carrier CR1 and the second connecting shaft 21, and the third connecting shaft 22 that is connected to the output gear 31. The reverse clutch C2 is disposed between the sun gear S1 and the third connecting shaft 22.

Next, operation of the continuously variable transmission $1_4$ of the fourth embodiment will be described with reference to FIG. 8(b). When a driver moves the shift lever to the position for the N (neutral) range, the forward clutch C1 and the reverse clutch C2 are both hydraulically released (as indicated by the "X" in the drawing) by a hydraulic controller.

At this time, rotation from the engine is/input to the input shaft 2 and the primary pulley 11 is rotatably driven via the torque converter 3 and the first connecting shaft 5. Also, the pulley width of the primary pulley 11 is controlled to the low speed side (i.e., in the direction in which the pulley width increases) by the shift hydraulic actuator, and the squeezing force on the belt 13 applied to the secondary pulley 12 is controlled by its hydraulic actuator for maintaining belt-squeezing force. In this manner rotation is slowed in transmission from the primary pulley 11 to the secondary pulley 12, i.e., the secondary pulley 12 rotates slower than the primary pulley 11.

Rotation slowed by the stepless speed change unit 10 in this way is output to the second connecting shaft 21 by the secondary pulley 12 and input to the carrier CR1 of the planetary gear set DP. Also at this time, the sun gear S1 rotates in a direction opposite to and slightly faster than the carrier CR1, via the ring gear R1 which is fixed, as shown in FIG. 8(a).

When the output rotation of the engine is in the forward direction, the primary pulley 11 rotates in the forward direction about the first axis CT1 via the input shaft 2, the torque converter 3, and the first connecting shaft 5. The secondary pulley 12 which is rotatably driven via the belt 13, the second connecting shaft 21, and the ring gear R1 also rotate in the forward direction about the second axis CT2. That is, the carrier CR1 and the second connecting shaft 21 rotate in the same direction as the rotation output by the stepless speed change unit 10 (i.e., in the same direction as the rotation of the secondary pulley 12), and the sun gear S1 rotates in the direction opposite that of the rotation output by the stepless speed change unit 10, i.e., in a direction the opposite of the rotation of the secondary pulley 12.

Because the forward clutch C1 and the reverse clutch C2 are released, as described above, the forward rotation of the ring gear R1 (and the second connecting shaft 21) and the reverse rotation of the sun gear S1 are not transmitted to the third connecting shaft 22. As a result, the continuously variable transmission $1_4$ of this fourth embodiment is in a neutral state, with no power being transmitted to the left and right wheel axles 52r and 52l.

As also shown in FIG. 8(b), when the driver moves the shift lever to the position for D (drive) range, a hydraulic controller, not shown, applies the forward clutch C1 (as indicated by the circle in the drawing) and releases the reverse clutch C2 (as indicated by "X" in the drawing).

As a result, the rotation of the secondary connecting shaft 21, which is rotatably driven by the secondary pulley 12 along with the carrier CR1, is transmitted to the third connecting shaft 22 via the forward clutch C1, i.e., the second connecting shaft 21, the carrier CR1, and the third connecting shaft 22 are all directly connected. Further, the forward rotation of the third connecting shaft 22 is transmitted to a large diameter gear 41 of the countershaft mechanism 40 by the output gear 31 which is mounted on the third connecting shaft and centered on the second axis CT2. A countershaft 42 rotates about the third axis CT3 in the reverse direction and at a slower speed determined by the gear ratio of the output gear 31 to the large diameter gear 41. The slowed reverse rotation of the countershaft 42 is then transmitted to the ring gear 51 centered on the fourth axis CT4, where it is further slowed to a speed determined by the gear ratio of the small diameter gear 43 to the ring gear 51, as well as reversed in direction again. As a result, forward rotation, i.e., rotation in the same direction as that of the engine, is transmitted to the ring gear 51. That is, driving torque as forward rotation is transmitted to the left and right wheel axles 52r and 52l, such that the vehicle drive wheels are driven in the forward direction.

When the vehicle is traveling forward in this way, no torque acts on the sun gear S1, the carrier CR1, or the ring gear R1, and the sun gear rotates idly.

As shown in FIG. 8(b), when a driver moves the shift lever to the position for R (reverse) range, the reverse clutch C2 is hydraulically applied (as indicated by the circle in the drawing) and the forward clutch C1 is hydraulically released (as indicated by "X" in the drawing) by a hydraulic controller.

As a result, the rotation of the sun gear S1, which is in the reverse direction and slightly faster than the rotation of the secondary pulley 12 (see FIG. 8(a)), is transmitted to the third connecting shaft 22 via the reverse clutch C2, as described above. The reverse rotation of the third connecting shaft 22 is transmitted to the large diameter gear 41 of the countershaft mechanism 40 by the output gear 31 mounted on the third connecting shaft 22 and centered on the second axis CT2. The countershaft 42 is rotatably driven by output gear 31 about the third axis CT3 in the forward direction at a slower speed determined by the gear ratio of the output gear 31 to the large diameter gear 41. The slowed forward rotation of the countershaft 42 is transmitted to the ring gear 51 on the fourth axis CT4, where it is further slowed to a speed determined by the gear ratio of the small diameter gear 43 to the ring gear 51, as well as reversed in direction. As a result, reverse rotation, i.e., rotation in the direction opposite that of the engine, is transmitted to the ring gear 51. That is, driving torque as reverse rotation is transmitted to the left and right wheel axles 52r and 52l, and the vehicle drive wheels are driven in the reverse direction.

When running in reverse, and especially during power on, the ring gear R1 receives both the torque input via the stepless speed change unit 10 by the carrier CR1, and the torque of the reaction force determined by the gear ratio of the ring gear R1 and the sun gear S1 to the sun gear S1, as in the third embodiment. In the continuously variable transmission $1_4$ of this fourth embodiment the ring gear R1 is fixed to the case 7 so that a large brake for same is not necessary, which enables the continuously variable transmission $1_4$ to be made more compact.

The torque Tr received by the ring gear R1 can be expressed by the equation: Tr=(1+Zs/(Zr−Zs))Ts, wherein Ts is the torque output by the secondary pulley 12, Zs is the number of teeth on the sun gear S1, and Zr the number of teeth on the ring gear R1.

When running in reverse, power is transmitted via the planetary gear set DP, as described above, so that gear noise is generated by the planetary gear set DP. However, in the continuously variable transmission $1_4$ according to this fourth embodiment, the forward-reverse switching mechanism $20_4$ is arranged after the stepless speed change unit 10 so when the speed ratio is large, such as during take-off of the vehicle, in particular, rotation that has been slowed by the stepless speed change unit 10 is input to the planetary gear set DP. As a result, the rotational speeds of the sun gear S1 and the carrier CR1 are relatively low and gear noise is thereby reduced.

Also, when the vehicle is traveling in reverse as well as when it is traveling forward, as described above, the pulleys are hydraulically controlled by a hydraulic controller, based on control signals from an ECU, for example. The pulley width of the primary pulley 11 is controlled by its hydraulic actuator for shifting and the squeezing force of the secondary pulley 12 on the belt 13 is controlled by its hydraulic actuator for stepless shifting.

As in the third embodiment, when the vehicle is being towed, as shown in FIG. 8(b), the forward clutch C1 and the reverse clutch C2 are both released (as indicated by "X" in the drawing). As a result, no rotation is transmitted to the planetary gear set DP, the second connecting shaft 21, the stepless speed change unit 10, the first connecting shaft 5, the torque converter 3, the input shaft 2, or the engine. That is, because the planetary gear set DP and the stepless speed change unit 10 are not rotated, the adverse affect if rotatably driven without lubricating oil being supplied thereto is avoided. Accordingly, it is possible to improve the durability of the continuously variable transmission $1_4$.

As in the third embodiment, even if the vehicle is stopped suddenly, i.e., even if the driver panic brakes and the vehicle comes to a sudden stop while the stepless speed change unit 10 is still on the high speed side, as described above, the stepless speed change unit 10 can be disconnected from the left and right wheel axles 52r and 52l (i.e., the vehicle drive wheels) by moving the shift lever to the position for the N range or by electronic neutral control, for example. Thereafter, the stepless speed change unit 10 can be changed to the low speed side while the pulleys 11 and 12 are being rotatably driven by the engine.

As described above, in the continuously variable transmission $1_4$ of the fourth embodiment, power from the engine is transmitted through, in order, the input shaft 2, the stepless speed change unit 10, the forward-reverse switching mechanism $20_4$, and the left and right wheel axles 52r and 52l. The forward-reverse switching mechanism $20_4$ includes the planetary gear set DP, the reverse clutch C2, and the forward clutch C1. The planetary gear set DP has the carrier CR1 that rotates in the same direction as the rotation output from the stepless speed change unit 10, the ring gear R1 that is always fixed, and the sun gear S1 which rotates in the direction opposite that of the rotation output from the stepless speed change unit 10. The reverse clutch C2 is disposed between the sun gear S1 and the left and right wheel axles 52r and 52l, and the forward clutch C1 is disposed between the carrier CR1 and the left and right wheel axles 52r and 52l. As a result, this structure enables the transmission of power between the stepless speed change unit 10 and the left and right wheel axles 52r and 52l to be interrupted by the forward clutch C1 and/or by the reverse clutch C2 when the vehicle is stopped suddenly or is being towed, for example. Also, even if the vehicle is stopped, it is still possible to return the pulleys 11 and 12 of the stepless speed change unit 10 to the low speed side while they are being rotatably driven, as well as to prevent the stepless speed change unit 10 from being rotated while the vehicle is being towed. As a result, it is no longer necessary to provide a separate clutch for interrupting power transmission or to provide a large brake for the ring gear, which features are advantageous for the reasons stated in connection with the first and second embodiments.

The countershaft mechanism 40 is disposed between the forward-reverse switching mechanism $20_4$ and the left and right wheel axles 52r and 52l. The input shaft 2 and the primary pulley 11 of the stepless speed change unit 10 are both arranged on the first axis CT1. The secondary pulley 12 of the stepless speed change unit 10 and the forward-reverse switching mechanism $20_4$ are arranged on the second axis CT2 which is in parallel with the first axis CT1. The countershaft mechanism 40 is arranged on the third axis CT3 that is in parallel with the first axis CT1 and the second axis CT2. The left and right wheel axles 52r and 52l are arranged on the fourth axis CT4 which is in parallel with the first axis CT1, the second axis CT2, and the third axis CT3. The forward clutch C1 is applied when in forward, and the reverse clutch C2 is applied when in reverse. As a result, it is possible to output forward or reverse rotation to the left and right wheel axles 52r and 52l, and to output a sufficiently large amount of torque for take-off in reverse as well as forward take-off due to the large diameter gear 41 and the small diameter gear 43 provided on the countershaft mechanism 40.

Moreover, rotation of the secondary pulley 12 is reversed by the countershaft mechanism 40, not by the planetary gear set DP. Therefore, when forward rotation is output to the left and right wheel axles 52r and 52l, power can be transmitted without passing through the planetary gear set DP. As a result, gear noise is reduced, thereby making forward running quieter.

The planetary gear set DP is a double pinion planetary gear set, with rotation from the stepless speed change unit 10 being input to the carrier CR1, the ring gear R1 being fixed, and the sun gear S1 rotating in reverse. As a result, when in reverse, reverse rotation can be output by the sun gear S1, such that reverse rotation is output to the left and right wheel axles 52r and 52l via the countershaft mechanism 40. Also, the sun gear S1 outputs a faster reverse rotation, which enables suitable torque to be output to the left and right wheel axles 52r and 52l, particularly when running in reverse where sudden acceleration is not required.

The carrier CR1 supports a first pinion gear P1 and a second pinion gear P2, the first pinion gear P1 being in mesh with both the sun gear S1 and the second pinion gear P2, and the second pinion gear P2 being in mesh with both the ring gear R1 and the first pinion gear P1, thus providing a double pinion planetary gear set DP.

While the first through the fourth embodiments have been described as a continuously variable transmission 1 provided with a torque converter 3, the invention is not so limited. For example, a take-off clutch may be utilized. That is, the invention is applicable to any structure wherein rotation output from the engine can first be adjusted in speed and then input to the stepless speed change unit 10 at times such as during take-off.

Further, while the first through the fourth embodiments have been described as having the continuously variable transmission 1 connected to the engine, the invention is not so limited. For example, the power source may be a combination of a motor and an engine, or only a motor. That is, the continuously variable transmission 1 according to the present invention may also be used in a hybrid vehicle, in an electric vehicle, or the like. The power source may be any power source to which the continuously variable transmission according to the present invention can be connected.

The continuously variable transmission 1 of the first through the fourth embodiments is preferably adapted for use in a FF (front-engine-front-drive) vehicle, but is not so limited, and may alternatively be adapted for use in a FR (front-engine-rear-drive) vehicle, a four-wheel-drive vehicle, or the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A continuously variable transmission comprising:
   a power source;
   an input shaft rotatably driven by said power source;
   a stepless speed change unit which includes a pair of pulleys, including a primary pulley driven by said input shaft and a secondary pulley driven by a belt that runs around said pair of pulleys and that is squeezed by said pulleys, said stepless speed change unit changing a speed ratio of said pair of pulleys by controlling the pulley widths of the primary pulley and the secondary pulley and thus changing the speed of the rotation of said input shaft, switching the rotation between forward and reverse rotation, and transmitting the rotation at the changed speed to an output shaft; and
   a forward-reverse switching mechanism that switches direction of rotation of said output shaft between forward output rotation and reverse output rotation;
   wherein power from the power source is transmitted, in order, through said input shaft, said stepless speed change unit, said forward-reverse switching mechanism, and said output shaft; and
   wherein said forward-reverse switching mechanism includes i) a gear mechanism including a first rotary element which rotates in the same direction as said secondary pulley, a fixed element which is always fixed so as not to rotate, and a second rotary element which rotates in a direction which is opposite that of said secondary pulley, ii) a first clutch disposed between said first rotary element and said output shaft, and iii) a second clutch disposed between said second rotary element and said output shaft.

2. The continuously variable transmission according to claim 1, wherein said input shaft and said primary pulley are arranged on a first axis, said secondary pulley and said forward-reverse switching mechanism are arranged on a second axis that is in parallel with the first axis, and said output shaft is arranged on a third axis that is in parallel with the first axis and the second axis; wherein said second clutch is applied when running in forward; and wherein said first clutch is applied when running in reverse.

3. The continuously variable transmission according to claim 2, wherein said gear mechanism is a single pinion planetary gear set that includes a sun gear, a ring gear, and a carrier that has a single pinion in mesh with said sun gear and said ring gear; and wherein said first rotary element is said sun gear into which rotation is input from said stepless speed change unit, said fixed element is said carrier, and said second rotary element is said ring gear.

4. The continuously variable transmission according to claim 2, wherein said gear mechanism is a ravigneaux type planetary gear set that includes a first sun gear, a second sun gear, a ring gear, and a carrier that has a long pinion gear that is in mesh with said first sun gear and said ring gear, and a short pinion gear that is in mesh with said long pinion gear and said second sun gear; wherein rotation from said stepless speed change unit is input to said first sun gear; and wherein said first rotary element is the carrier, said fixed element is said ring gear, and said second rotary element is said second sun gear.

5. The continuously variable transmission according to claim 1, further comprising a countershaft mechanism disposed between said forward-reverse switching mechanism and said output shaft; wherein said input shaft and said primary pulley are arranged on a first axis; wherein said secondary pulley and said forward-reverse switching mechanism are arranged on a second axis that is in parallel with the first axis; wherein said countershaft mechanism is arranged on a third axis that is in parallel with the first axis and the second axis; wherein said output shaft is arranged on a fourth axis that is in parallel with the first axis, the second axis, and the third axis; wherein said first clutch is applied when running in forward; and wherein said second clutch is applied when running in reverse.

6. The continuously variable transmission according to claim 5, wherein said gear mechanism is a single pinion planetary gear set that includes a sun gear, a ring gear, and a carrier that has a single pinion gear in mesh with said sun gear and said ring gear; and wherein said first rotary element is said ring gear into which rotation is input from said stepless speed change unit, said fixed element is said carrier, and said second rotary element is said sun gear.

7. The continuously variable transmission according to claim 5, wherein said gear mechanism is a double pinion planetary gear set that includes a sun gear, a ring gear, and a carrier which supports a first pinion gear in mesh with said sun gear and a second pinion gear in mesh with said ring gear; and wherein said first rotary element is said carrier into which rotation is input from said stepless speed change unit said fixed element is said ring gear, and said second rotary element is said sun gear.

8. The continuously variable transmission according to claim 7, wherein said first pinion gear is in mesh with said sun gear and said second pinion gear; and wherein said second pinion gear is in mesh with said ring gear and said first pinion gear.

9. The continuously variable transmission according to claim 1:
wherein said first clutch is released in one of forward drive and reverse drive so that no rotation is transferred from said first rotary element to said output shaft and engaged in the other of forward drive and reverse drive to transfer rotation of said first rotary element to said output shaft; and
wherein said second clutch is released in the other of forward drive and reverse drive so that no rotation is transferred from said second rotary element to said output shaft and engaged in the one of forward drive and reverse drive to transmit torque from said second rotary element to said output shaft.

10. The continuously variable transmission according to claim 9 wherein said forward-reverse switching mechanism includes only one planetary gear set.

11. The continuously variable transmission according to claim 10 wherein said one planetary gear set is a single pinion planetary gear set.

12. The continuously variable transmission according to claim 10 wherein said one planetary gear set is a ravigneaux planetary gear set.

13. The continuously variable transmission according to claim 10 wherein said one planetary gear set is a double pinion planetary gear set.

14. The continuously variable transmission according to claim 1 wherein said forward-reverse switching mechanism includes only one planetary gear set.

15. The continuously variable transmission according to claim 14 wherein said one planetary gear set is a single pinion planetary gear set.

16. The continuously variable transmission according to claim 14 wherein said one planetary gear set is a ravigneaux planetary gear set.

17. The continuously variable transmission according to claim 14 wherein said one planetary gear set is a double pinion planetary gear set.

* * * * *